(12) United States Patent
Seki et al.

(10) Patent No.: US 6,689,303 B2
(45) Date of Patent: Feb. 10, 2004

(54) INJECTION MOLDING METHOD USING A STACKED MOLD

(75) Inventors: Koji Seki, Tokyo (JP); Nobuyuki Sugiyama, Tokyo (JP); Shingo Ogawa, Tokyo (JP); Naoki Oguro, Tokyo (JP)

(73) Assignee: Yamatake Corporation, Tokyo (JP)

( * ) Notice: Subject to any disclaimer, the term of this patent is extended or adjusted under 35 U.S.C. 154(b) by 32 days.

(21) Appl. No.: 10/041,931

(22) Filed: Jan. 7, 2002

(65) Prior Publication Data

US 2003/0072839 A1 Apr. 17, 2003

(30) Foreign Application Priority Data

Oct. 15, 2001 (JP) .......................... 2001-317378

(51) Int. Cl.$^7$ ............................... B29C 45/64
(52) U.S. Cl. ................ 264/328.1; 264/328.4; 425/544; 425/591; 425/594
(58) Field of Search .................. 264/328.1, 328.11, 264/328.4; 425/594, 591, 544

(56) References Cited

U.S. PATENT DOCUMENTS

| | | | | |
|---|---|---|---|---|
| 4,212,626 A | * | 7/1980 | Gellert | 425/562 |
| 4,636,167 A | * | 1/1987 | Shibata | 425/589 |
| 5,055,250 A | * | 10/1991 | Schad et al. | 264/297.2 |
| 5,443,378 A | * | 8/1995 | Jaroschek et al. | 425/130 |
| 5,951,936 A | * | 9/1999 | Coxhead | 264/328.1 |
| 6,024,560 A | * | 2/2000 | Ito et al. | 425/593 |

FOREIGN PATENT DOCUMENTS

| | | |
|---|---|---|
| JP | Kokai 61-271419 | 12/1986 |
| JP | Kokai 61-294316 | 12/1986 |
| JP | 2-028411 | 7/1990 |
| JP | Kokai 5-147061 | 6/1993 |

OTHER PUBLICATIONS

"Preliminary Information from Plastic Technical Services Laboratory about Du Pont Teflon Fluorocarbon Resin, Du Pont Tefzel Fluoropolymer Fluorocarbons Division, Plastics Department, E.I.Du Pont De Nemours & Co. (Inc.), Wilm., Del. 19898 PIB #36 (Reviced), Aug. 1973".

* cited by examiner

*Primary Examiner*—Jill L. Heitbrink
*Assistant Examiner*—Monica A Fontaine

(57) ABSTRACT

An injection molding apparatus includes a vessel, mold, pusher, and thrust providing section. The vessel stores a molding material and has a nozzle hole which is formed in the bottom portion to inject the molding material and a first seal surface formed around the nozzle hole. The mold is made up of stacked members stacked on the lower side of the vessel and is filled with the molding material injected from the vessel. The mold has a sprue communicating with the nozzle hole and a second seal surface formed around the sprue. The stacked members respectively have third seal surfaces at portions where the members are in contact with each other. The pusher pressurizes the molding material in the vessel. The thrust providing section provides a thrust to the pusher to pressurize one of the pusher and the mold through the molding material in the vessel. The thrust providing section brings the first, second, and third seal surfaces into tight contact with each other by providing a downward thrust to the pusher with respect to the mold. An injection molding method is also disclosed.

2 Claims, 12 Drawing Sheets

| BORE TYPE | FILLING TIME (sec) | OPEN VALVE | SET PRESSURE (Kg/cm²) | DELAY TIME (sec) | OPEN TIME (sec) | 0 1 2 3 4 5 6 7 8 9 10 11 12 13 14 |
|---|---|---|---|---|---|---|
| 4S STANDARD | 120 | HYDRAULIC CYLINDER | 32.6 | — | — | |
| | | COOLING CIRCUIT C1 | 7 | 30 | 240 | |
| | | COOLING CIRCUIT C2 | 5 | 120 | 150 | |
| | | COOLING CIRCUIT C3 | 5 | 180 | 150 | |
| | | COOLING CIRCUIT C4 | 5 | 240 | 150 | |
| | | COOLING CIRCUIT C5 | 5 | 300 | 150 | |
| | | COOLING CIRCUIT C6 | 5 | 450 | 270 | |

FIG.15

INJECTION MOLDING METHOD USING A STACKED MOLD

BACKGROUND OF THE INVENTION

The present invention relates to an injection molding method and apparatus and, more particularly, to an injection molding method and apparatus which are suitably used for, for example, forming a lining inside the measuring pipe of an electromagnetic flowmeter and molding a resin pipe.

In an electromagnetic flowmeter for measuring the flow rate of a conductive fluid flowing in a measuring pipe by using the electromagnetic induction phenomenon, to prevent a shortcircuit between an electromotive force produced in the fluid and the measuring pipe made of a nonmagnetic material such as stainless steel, the inner surface of the measuring pipe, which is the liquid contact surface, and the surfaces of the flanges, integrally formed on the two end portions of the measuring pipe, to which pipes are connected (to be referred to pipe connection end faces hereinafter) are generally covered with a lining material. As a lining material, an insulating material such as a fluoroplastic material is generally used because heat resistance, corrosion resistance, electric insulating properties, and the like are required. Such a lining material is formed on the inner surface of the measuring pipe and the pipe connection end faces of the flanges by injection molding.

When a measuring pipe covered with such a lining is to be molded by a transfer molding machine, the measuring pipe body is loaded in a mold, and the mold is heated to the melt temperature of a lining material or higher. Thereafter, the molten lining material is pressurized and injected into the mold to cover the inner surface of the measuring pipe body and the pipe connection end faces of flanges with the lining material.

In lining a measuring pipe, a fluoroplastic material used as a lining material has poor adhesion with a metal, and hence tends to peel off from the measuring pipe. For this reason, as disclosed in Japanese Patent Laid-Open Nos. 61-294316 and 61-271419 and Japanese Utility Model Publication No. 2-28411, a reinforcing pipe formed by a perforated plate generally called a punching plate is mounted inside the measuring pipe body in advance, and the mounted reinforcing pipe is covered with a lining material. This increases the mechanical bond strength between the lining material and the measuring pipe to prevent the lining material from peeling off, and also prevents deformation and the like of the lining material due to changes in temperature and pressure inside the measuring pipe.

FIG. 16 shows a conventional injection molding apparatus used to mold a measuring pipe. Referring to FIG. 16, an injection molding apparatus 1 includes a mold 4 constituted by a upper mold 2 and lower mold 3 and an injection nozzle (not shown). The lower mold 3 is made up of a first lower mold 5, second lower mold 6, and core 7. A molten molding material 9 such as a fluoroplastic material is pressurized and injected into a cavity 8 formed in the mold 4 to line the inner surface of the second lower mold 6 and an annular recess portion 15 formed in a pipe connection end face 10a of a flange 10, thereby extracting the second lower mold 6 as a measuring pipe 11. That is, the injection molding apparatus 1 uses the measuring pipe body as the second lower mold 6, and lines the measuring pipe body by outsert molding. Note that reference numeral 16 denotes a reinforcing pipe mounted inside the second lower mold 6 through a spacer 17; and 18, a cooling circuit (cooling medium route) of the mold 4.

In injection molding of a measuring pipe, if the clamping pressure (closing force) of the mold 4 is insufficient with respect to a molding pressure (injection pressure), the molten molding material 9 leaks from a joint portion 12A between the upper mold 2 an the second lower mold 6 and a joint portion (to be referred to as a seal portion hereinafter) 12B between the first lower mold 5 and the second lower mold 6. In this case, the leaking portion of the molding material 9 hardens and remains as a burr on the surface of the molded product. If the molding material 9 excessively leaks, a sufficient amount of resin is not charged into the mold 4, resulting in incapability of molding. In order to prevent this, for example, the mold 4 is closed with a plurality of bolts 13 and a closing plate 14 or by using a hydraulic closing mechanism to prevent the seal portions 12A and 12B from opening.

Letting D ($cm^2$) be the total projection area of a molded product, P ($Kg/cm^2$) be the injection pressure, and W (Kg) be the closing force, the following condition must be satisfied to prevent the seal portions 12A and 12B from opening:

$$DP < W$$

Note that the total projection area D indicates the area of the inner wall surface of the mold 4 which is in contact with the molten resin in the direction of closing (the axial direction of the bolt 13). Therefore, "DP" indicates a component force, in the direction of closing, of the force which the mold 4 receives from the molten resin.

Such an injection molding method is disclosed in "TRANSFER MOLDING METHOD FOR THERMOPLASTIC RESIN AND METHOD FOR COATING BODY WITH THERMOPLASTIC RESIN", Japanese Patent Laid-Open No. 5-147061. According to this reference, the statement "the extrusion molding machine is coupled to another pot to which a target body-mounted mold is coupled/closed" indicates that this technique includes some closing means although it is not described in detail.

A mold and molding apparatus and method which are used to transfer-mold a fluoroplastic lining on the inside of a pipe are disclosed in detail in "Preliminary Information from Plastic Technical Services Laboratory about DU PONT TEFLON FLUOROCARBON RESIN, DU PONT TEFZEL FLUOROPOLYMER FLUOROCARBONS DIVISION, PLASTICS DEPARTMENT, E. I. DU PONT DE NEMOURS & CO. (INC.), WILM., Del. 19898 PIB #36 (Revised), August 1973". According, page 23, lines 10–13, "It is not necessary to bolt the melt pot assembly to the mold as the melt pot area is much greater than the gate area. As a result, the "sealing force" between the mold and nozzle is far greater than the force exerted by the melt at the nozzle/sprue bushing interface.", the sealing property of the interface between the nozzle of the melt pot and the sprue hole of the mold can be ensured by using the injection pressure exerted on the molten material. However, the mold itself must be closed by bolt fastening as in the prior art shown in FIG. 16.

As described above, in the conventional injection molding apparatus 1, the mold 4 is closed by the bolts 13 and closing plate 14 or a hydraulic closing mechanism to prevent the molding material 9 from leaking out from the seal portions 12A and 12B. In the closing operation using the bolts 13 and closing plate 14, however, the operator must mount/dismount the closing plate 14 for every molding operation, resulting in a heavy load on the operator and significant deteriorations in operability and productivity.

The use of a hydraulic closing mechanism will increase the size of an injection molding apparatus itself, resulting in an increase in cost.

SUMMARY OF THE INVENTION

It is an object of the present invention to provide an injection molding method and apparatus which do not require a means dedicated to mold closing, e.g., bolts or a hydraulic closing mechanism.

It is another object of the present invention to provide an injection molding method and apparatus which prevent plastic deformation and destruction of a mold.

In order to achieve the above objects, according to the present invention, there is provided an injection molding apparatus comprising a vessel which stores a molding material, the vessel having a nozzle hole which is formed in a bottom portion to inject the molding material and a first seal surface formed around the nozzle hole, a mold which is made up of a plurality of stacked members stacked on a lower side of the vessel and is filled with the molding material injected from the vessel, the mold having a sprue communicating with the nozzle hole and a second seal surface formed around the sprue, and the stacked members respectively having third seal surfaces at portions where the members are in contact with each other, a pusher for pressurizing the molding material in the vessel, and thrust providing means for providing a thrust to the pusher to pressurize one of the pusher and the mold through the molding material in the vessel, the thrust providing means bringing the first, second, and third seal surfaces into tight contact with each other by providing a downward thrust to the pusher with respect to the mold.

BRIEF DESCRIPTION OF THE DRAWINGS

FIG. 15 is a view showing a cooling sequence in the injection mold in FIG. 8.

DESCRIPTION OF THE PREFERRED EMBODIMENTS

The present invention will be described in detail below with reference to the accompanying drawings.

Figure 1:
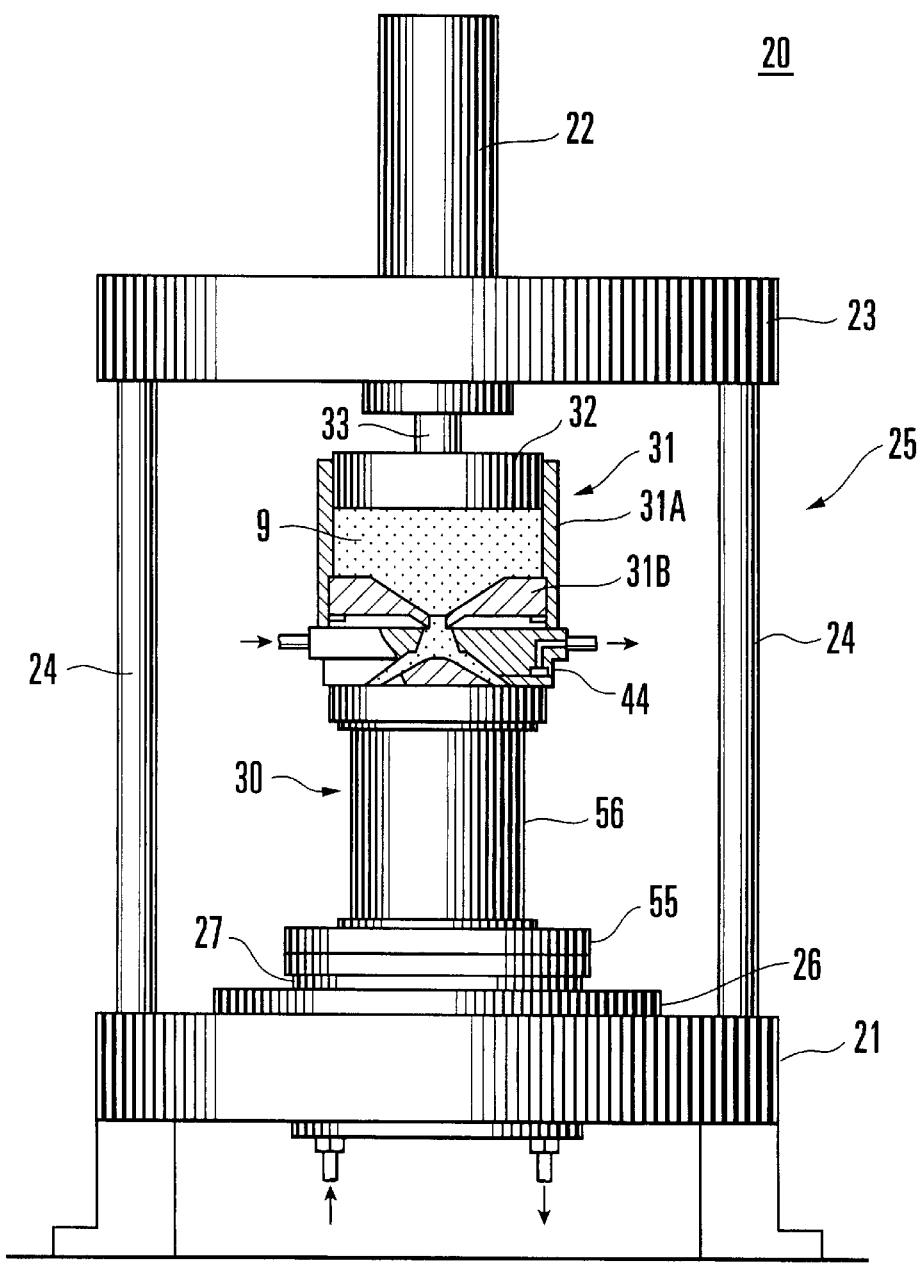
FIG. 1 is a partially cutaway front view of an injection molding apparatus according to the first embodiment of the present invention.

FIG. 1 shows the schematic arrangement of an injection molding apparatus according to the first embodiment with a cutaway view of its portion.

Figure 3:
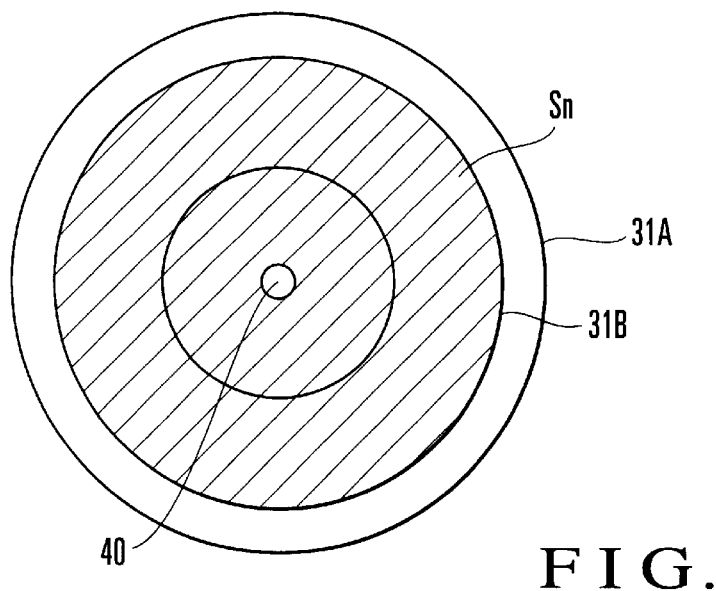
FIG. 3 is a view showing a projection area viewed from above a bottom plate in FIG. 2.
Figure 4:
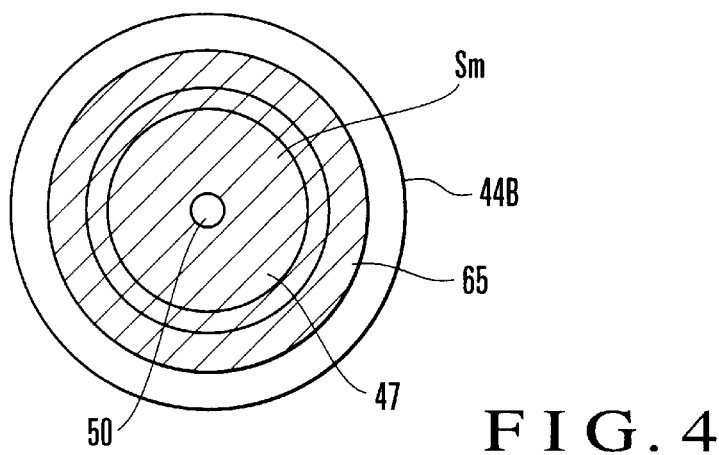
FIG. 4 is a view showing a projection area viewed from below a upper mold in FIG. 2.

Referring to FIG. 3, the hatched portion indicates a projection area, and the second circle from the inside indicates the outline of a conical recess portion formed in the upper surface of a bottom plate. Referring to FIG. 4, the hatched portion indicates a projection area, the second circle from the outside indicates the outline of an annular recess portion formed in the bottom surface of a upper mold, and the third circle from the outside indicates the outline of a conical recess portion.

Referring to FIG. 1, a frame 25 having a sufficient mechanical strength is comprised of a base plate 21 with legs installed on the floor, a cylinder mount plate 23 on which a hydraulic cylinder 22 is fixed, and four columns 24 for coupling the base plate 21 to the cylinder mount plate 23. The frame 25 acts as a thrust providing means for providing a thrust to a pusher 32 (to be described later) in cooperation with the hydraulic cylinder 22. A pot type vertical injection molding apparatus 20 is constituted by the frame 25, a mold mount plate 26 mounted on the base plate 21, a injection mold 30 which is mounted on the mold mount plate 26 through a heat-insulating member 27 such as a ceramic member, a cylindrical transfer pot (vessel) 31 with a bottom which is mounted on the mold 30, the pusher 32 for pressurizing a molten molding material 9 in the transfer pot 31, and the hydraulic cylinder (thrust providing means) 22 for lowering the pusher 32.

The hydraulic cylinder 22 has a vertically movable plunger 33 mounted upside down on the cylinder mount plate 23 supported by the columns 24. The lower end face of the plunger 33 comes into contact with the upper surface of the pusher 32 when the plunger 33 is lowered under a hydraulic pressure, and is separated from the upper surface of the pusher 32 when the plunger 33 is raised and restored.

The pusher 32 is formed into a thick disk-like member and fitted in the transfer pot 31. An appropriate gap is ensured between the inner surface of the transfer pot 31 and the pusher 32. Air is made to escape through this gap to facilitate the operation of fitting the pusher 32 in the transfer pot 31.

Figure 2:
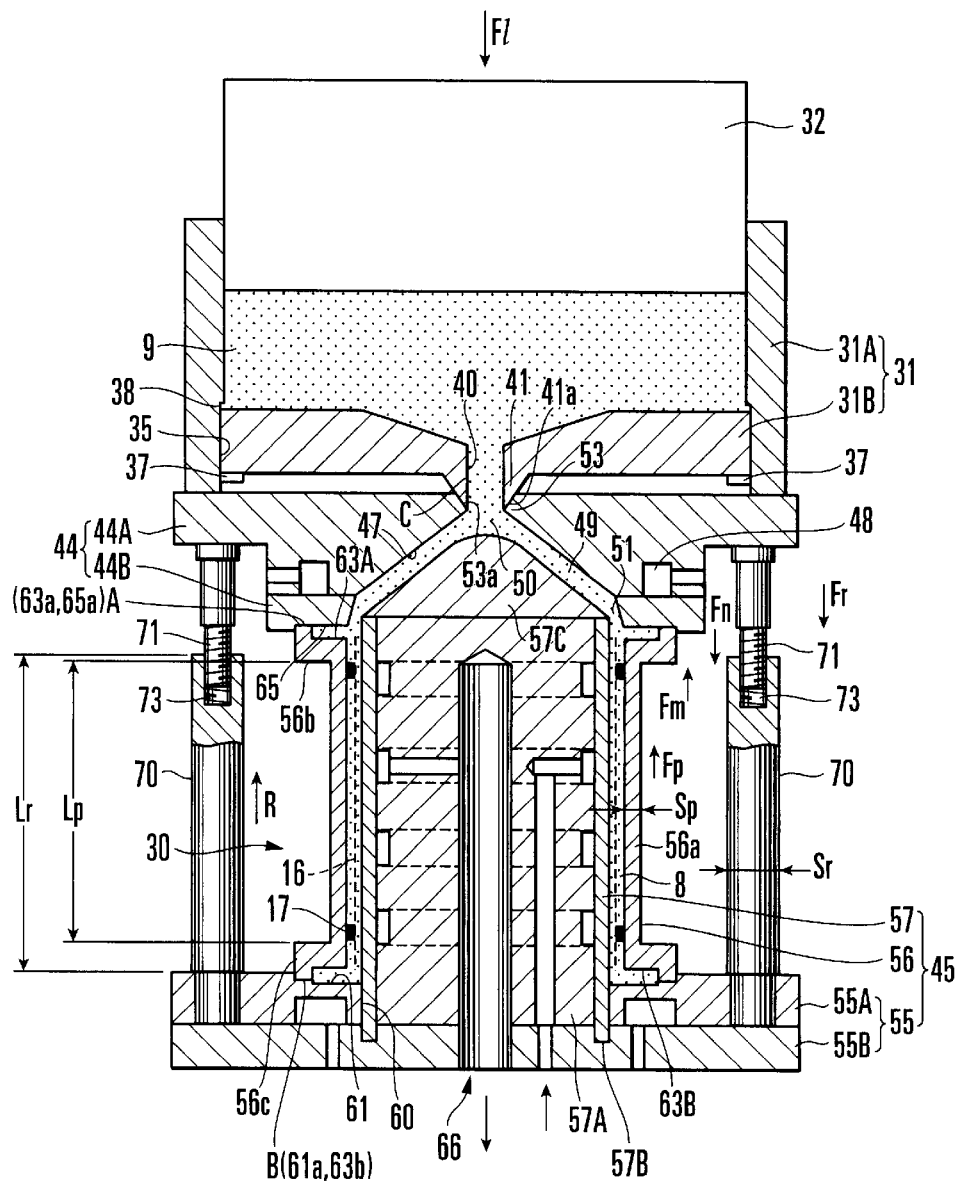
FIG. 2 is a sectional view of the injection mold in FIG. 1.

The transfer pot 31 is made up of a cylindrical member 31A and a disk-like bottom plate 31B covering the lower opening portion of the cylindrical member 31A. An annular groove 35 in which the bottom plate 31B is fitted is formed in the inner surface of the lower end portion of the cylindrical member 31A, as shown in FIG. 2. The annular groove 35 and bottom plate 31B are slidable in a state where almost no gap is formed between the inner surface of the annular groove 35 and the outer surface of the bottom plate 31B, i.e., no molten molding material 9 leaks. To prevent the cylindrical member 31A and bottom plate 31B from separating from each other, a plurality of pins (lock members) 37 extend vertically upward from the inner surface of the lower end of the cylindrical member 31A, thus supporting the bottom plate 31B and preventing it from falling off from the cylindrical member 31A. The displacement amount of the bottom plate 31B in the vertical direction is restricted by the pins 37 and a stepped portion 38 formed in the inner surface of the cylindrical member 31A upon formation of the annular groove 35.

The bottom plate 31B has a through hole as a nozzle hole 40 in its central portion. A conical projection 41 surrounding the nozzle hole 40 is integrally formed upright on the central portion of the lower surface of the bottom plate 31B. The lower end portion of the outer surface of the projection 41 forms a seal surface 41a for the injection mold 30.

The injection mold 30 is made up of a upper mold 44 and lower mold 45 which constitute a stacked member. The upper mold 44 has a conical recess portion 47 formed in the central portion of the lower surface and an annular cooling circuit 48 formed inside the wall. The reason why the upper mold 44 is made up of first and second upper mold members 44A and 44B is that the cooling circuit 48 must be formed. After the cooling circuit 48 is formed, the first and second upper mold members 44A and 44B are fastened to each other with bolts to be integrated.

The recess portion 47 of the upper mold 44 forms a runner 49, together with a core 57 (to be described later). More specifically, a portion which is open to the upper surface of the upper mold 44 and communicates with the nozzle hole 40 forms a sprue 50, and the lower end portion communicating with a cavity 8 forms a gate 51. A conical recess portion 53 is formed, around the sprue 50, in the central portion of the upper surface of the upper mold 44. The projection 41 of the bottom plate 31B is fitted in the recess portion 53. A ring-like seal surface 53a with which the seal surface 41a formed on the outer surface portion of the projection 41 is in tight contact is formed in the inner wall surface of the recess portion 53. A seal portion C is formed by these seal surfaces 41a and 53a.

When the transfer pot 31 is to be mounted on the upper mold 44, the projection 41 of the bottom plate 31B is fitted in the recess portion 53 of the upper mold 44 to bring the seal surfaces 41a and 53a into tight contact with each other. As a consequence, the nozzle hole 40 and sprue 50 are automatically positioned and communicate with each other to form the seal portion C. The area of the seal portion C is set to be sufficiently smaller than that of each of the two seal portions A and B (to be described later). While the transfer pot 31 is mounted on the upper mold 44, the lower end of the cylindrical member 31A is in contact with the upper surface of the upper mold 44, and hence the transfer pot 31 can be mounted with high stability. The transfer pot 31 is simply mounted on the upper mold 44 but is not fixed. Therefore, the transfer pot 31 can rotate, within a horizontal plane, about the projection 41 and recess portion 53 serving as a rotation axis while the transfer pot 31 is mounted on the upper mold 44 and the pusher 32 receives no thrust from the hydraulic cylinder 22. This state is necessary for sprue separation (to be described later).

The lower mold 45 is made up of first and second lower molds 55 and 56 (each serving as a stacked member) and the core 57. The first force 55 is constituted by first and second lower mold members 55A and 55B and positioned/fixed on the mold mount plate 26 through the heat-insulating member 27. The second lower mold 56 and core 57 are positioned on the first lower mold 55, and the upper mold 44 is positioned on them. A seal portion A is formed by the ring-like joint portions of the upper mold 44 and the second lower mold 56 which are in tight contact with each other. A seal portion B is formed by the ring-like joint portions of the first and second lower molds 55 and 56 which are in tight contact with each other. The seal portion A has the same area as that of the seal portion B.

The first lower mold member 55A has a hole 60 in its central portion, through which the core 57 extends. An annular recess portion 61 surrounding the hole 60 is formed in the upper surface of the first lower mold member 55A. A seal surface 61a with which the lower surface of the second lower mold 56 is in tight contact is formed on the outer bottom surface of the recess portion 61.

As the second lower mold 56, a measuring pipe for an electromagnetic flowmeter is used. The second lower mold 56 is made up of a cylindrical pipe body 56a having an inner diameter larger than the outer diameter of the core 57 and two flanges 56b and 56c which are integrally formed on the opening portions of the two ends of the pipe body 56a or fixed by welding. A reinforcing pipe 16 formed by a perforated plate is mounted in the pipe body 56a through a spacer 17.

Figure 5:
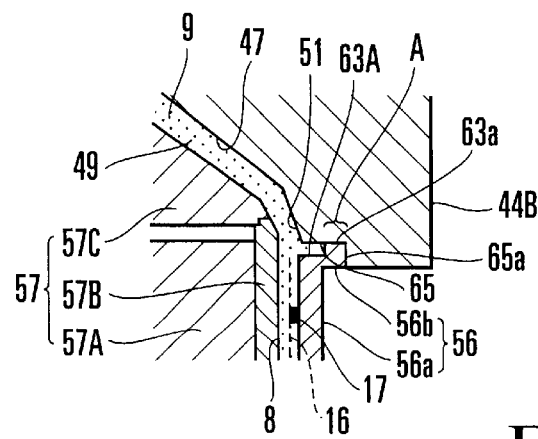
FIG. 5 is an enlarged sectional view of a portion near seal surface in FIG. 2.

Annular grooves 63A and 63B which are to be filled with the molding material 9 are formed in the pipe connection end faces of the flanges 56b and 56c. As shown in FIG. 5, a seal surface 63a with which a seal surface 65a of the upper mold 44 is in tight contact is formed on the outer surface of the upper flange 56b which is located outside the annular groove 63A. The seal portion A is formed by the seal surfaces 63a and 65a. The seal surface 65a serves as the outer bottom surface of an annular recess portion 65 formed in the lower surface of the upper mold 44. A seal surface 63b with which the seal surface 61a of the first lower mold 55 is in tight contact is formed on the outer surface of the lower flange 56c which is located outside the annular groove 63B. The seal portion B is formed by the seal surfaces 61a and 63b.

The core 57 is comprised of a cylindrical core body 57A, a cylindrical member 57B fitted in the core body 57A, and a conical member 57C fixed on the upper surfaces of the core body 57A and cylindrical member 57B by welding. The space defined between the core 57 and the first and second lower molds 55 and 56 forms the cavity 8 which is filled with the molding material 9. The conical member 57C is coaxially inserted in the recess portion 47 of the upper mold 44 with an appropriate gap being ensured. This gap forms the runner 49 trough which the molding material 9 runs, and the lower end portion communicating with the cavity 8 forms the gate 51.

A plurality of support members 70 extend vertically upward from the first lower mold 55. Connecting bolts 71 threadably engage with the upper ends of the support members 70. The head portions of the connecting bolts 71 come into contact with the lower surface of the second upper mold member 44B. The support members 70 and connecting bolts 71 are selectively mounted or dismounted depending on molding conditions. FIG. 2 will be described first, assuming that the support members 70 and connecting bolts 71 are dismounted. A state where the support members 70 and connecting bolts 71 are mounted as shown in FIG. 2 will be described later.

The injection mold 30 is assembled by simply stacking/positioning the upper mold 44, lower mold 45, and transfer pot 31 by their own weights. Therefore, the bolts 13 and closing plate 14 shown in FIG. 16 and any hydraulic closing mechanism are not provided. The mold in this embodiment basically differs from the conventional mold in that molding is performed after the three seal portions A, B, and C are sealed by using the pressurizing force exerted from the pusher 32 onto the molding material 9.

A procedure for lining the measuring pipe body of the electromagnetic flowmeter by using the injection molding apparatus 20 having the above arrangement will be described next.

First of all, the mold 30 is placed in a heating furnace, together with the transfer pot 31 and molding material 9, and heated to a predetermined temperature (350 to 370° C.). While the molding material 9 is heated and melted, the pusher 32 is removed from the transfer pot 31 and held at room temperature. The pusher 32 is mounted on the transfer pot 31 immediately before the molten molding material 9 is injected into the cavity 8. After the heated mold 30 and transfer pot 31 are placed on the mold mount plate 26, the hydraulic cylinder 22 is driven to make the plunger 33 press the pusher 32 so as to give the pusher 32 a predetermined thrust F1.

When the thrust F1 is given to the pusher 32 to pressurize the molding material 9, the molding material 9 pressurized/injected from the nozzle hole 40 of the bottom plate 31B into the cavity 8 through the sprue 50, runner 49, and gate 51. The molding material 9 is pressurized/injected by the pusher 32 for about 2 min. With this operation, air in the cavity 8 is discharged outside through the seal portions A and B under an injection pressure P exerted by the pusher 32. The seal portions A and B are processed with a surface roughness enough to discharge air but not enough to discharge a molten resin. Since air and a molten resin greatly differ in viscosity, such operation can be realized by adjusting the surface roughness of the seal portions A and B.

The molding material 9 pressurized by the pusher 32 is injected from the nozzle hole 40 while pressurizing the bottom plate 31B downward. At this time, the molding material 9 tends to leak upward through the gap (about 0.3 to 1.0 mm on one side in general) between the transfer pot 31 and the pusher 32 in the radial direction. However, since the temperature of the pusher 32 is set to be lower than that of the molding material 9, a portion of the molding material 9 which touches the pusher 32 is quenched and hardens to seal the gap, thus serving as a packing. Consequently, the molten molding material 9 does not leak outside.

In addition, the molten molding material 9 pushes upward with its pressure the molding material 9 which hardens in the gap. The molding material 9 which hardens in the gap acts to raise the transfer pot 31 with the frictional force between itself and the transfer pot 31. This separates the lower end of the cylindrical member 31A of the transfer pot 31 from the upper surface of the upper mold 44. When the pins 37 come into contact with the lower surface of the bottom plate 31B, the transfer pot 31 is inhibited from being raised further. In this state, the transfer pot 31 and upper mold 44 are in contact with each other through only the seal portion C. Most of a thrust P1 exerted on the pusher 32 is applied to the seal portion C. As described above, since the area of the seal portion C is smaller than that of each of the seal portions A and B, a sufficiently high seal pressure is produced in the seal portion C. This makes it possible to prevent the molten molding material 9 from leaking through the seal portion C.

The force F1 with which the hydraulic cylinder 22 pushes the pusher 32 downward acts on an area S1 of the lower surface of the pusher 32 to produce an injection pressure P in the molding material 9 melted in the transfer pot 31. Upon reception of this injection pressure P, a downward force Fn is produced in the bottom plate 31B and acts to press the upper mold 44 against the second lower mold 56 through the seal portion C. Strictly speaking, the weights of the pusher 32, transfer pot 31, molding material 9, and upper mold 44 also act to push the upper mold 44 downward. As will be described later, however, these weights are negligibly small as compared with the downward force Fn. When the second lower mold 56 is pressed against the first lower mold 55, the same clamping force is produced between them. The pressing force Fn exerted from the bottom plate 31B to the mold 30 can be obtained from the projection area Sn (the hatched portion in FIG. 3) of the pressure-receiving surface of the bottom plate 31B in the direction of the force F1 and the injection pressure P:

$$Fn = P \cdot Sn = F1 \cdot Sn/S1$$

On the other hand, an upward thrust (a force that tries to separate the upper mold 44 from the second lower mold 56) Fm is produced in the mold 30 by the injection pressure P. This thrust Fm is obtained from a projection area Sm (the hatched portion in FIG. 4) of the upper mold 44 and the injection pressure P:

$$Fm = P \cdot Sm = F1 \cdot Sm/S1$$

Therefore, a force F which is produced by the pressing force Fn acting on the upper mold 44 of the bottom plate 31B and with which the upper mold 44 presses the seal portion A (ditto for the seal portion B) of the second lower mold 56 can be given by $$F = Fn - Fm$$

When the pressing force Fn becomes smaller than the thrust Fm, since the pressing force F becomes negative, the upper mold 44 is raised, resulting in damage to the seal. Letting Sa be the area of the seal portion A, and Pa be the pressure (seal pressure) produced in the seal portion A, the seal pressure Pa is given by $$Pa = (Fn - Fm)/Sa = (Sn - Sm)P/Sa$$
$$= F1 \cdot (Sn - Sm)/S1 \cdot Sa$$

The following is a result of studying how the weights of the molding material 9, upper mold 44, second lower mold 56, transfer pot 31, and the like influence a seal ratio K (the value obtained by dividing the seal pressure Pa by the injection pressure P). When the bore sizes of the measuring pipes are 100 mm and 40 mm, the total weights of the molding materials 9, upper molds 44, second lower molds 56, transfer pots 31, and the like become about 21.5 Kg and 4.3 Kg, respectively. The pressing force Fn produced by the bottom plate 31B becomes 148 Kgf in the case of a bore of 100 mm, and 1,825 Kgf in the case of a bore of 40 mm. The thrust Fm becomes 3,382 Kgf in the case of a bore of 100 mm, and 1,378 Kgf in the case of a bore of 40 mm. It was therefore found that since the total weight was very small relative to these values, the total weight had little influence on the seal ratio K and could be neglected as an error range. Although described in detail later, the seal ratio K was 2.04 in the case of a bore of 100 mm, and 1.41 in the case of a bore of 40 mm.

In preventing the molding material 9 from leaking from the seal portion A, a minimum requirement (necessary condition) is that the pressure Pa should be a positive value. Experiments were conducted to find out how much pressure was required to prevent the molding material 9 from leaking out. As is obvious from the above equation, as the thrust of the pusher 32 increases, the injection pressure P and seal pressure Pa increase. If, however, the thrust of the pusher 32 increases excessively, internal stress remains in the molded product and becomes a cause of a fracture due to deformation and cracking.

The seal ratio K is given by $$K = Pa/P = (Fn - Fm)/Sa \cdot P = (Sn - Sm)/Sa$$

The seal ratio K is a dimensionless numerical value determined at the time of design of the injection mold 30. A condition (sufficient condition) under which the molding material 9 does not leak from the seal portion A is given by $$K = Pa/P > C$$

where C is a constant determined by the type, viscosity, temperature, and the like of the molding material 9 in an actual molding process and inductively obtained by experiment. Obviously, if the seal ratio K is smaller than the constant C, the molding material 9 leaks out from the seal portion A, and vice versa.

Molding is therefore actually performed while the seal ratio K and the type, viscosity, and temperature of the molding material 9 are changed, and the value of the seal ratio K at the time when the molding material 9 stops leaking is set as the constant C. Assume that when molding is performed with the seal ratio K being set to 0.3, the molding material 9 stops leaking from the seal portion A. In this case, the constant value C becomes 0.3. In this case, in order to prevent the molding material 9 from leaking from the seal portion A, the seal ratio K needs to be larger than 0.3. In the experiment, molding was performed by using a mold manufactured to have a large seal area S. Molding was repeatedly performed while the seal ratio K was increased by gradually decreasing the seal area S by gradually cutting the seal portion A. In this case, the seal ratio K at the time when the molding material 9 stopped leaking from the seal portion A was regarded as the constant C.

This embodiment has been described by exemplifying the seal portion A. This also applies to the seal portion B. As described above, since the area of the seal portion C is small, a considerably large seal ratio can be obtained, and no practical problem arises.

After the molding material 9 is completely injected, the molding material is left standing for several min while the thrust F1 from the hydraulic cylinder 22 is kept unchanged, thereby making the residual stress distribution in the molded member uniform. Subsequently, air is supplied as a cooling medium to the cooling circuit 66 to cool the mold 30 from the inside for a predetermined period of time, thereby hardening the molding material 9 in the cavity 8. Cooling of the mold will be described later.

After the molding material 9 hardens, the molding material 9 can be easily cut at the connecting portion between the nozzle hole 40 and the sprue 50 by rotating the transfer pot 31. The upper mold 44 is then raised, together with the transfer pot 31 to remove the second lower mold 56 from the first lower mold 55, and the burr and portions of the molding material 9 which harden at the runner 49 and gate 51 are cut. The second lower mold 56 is used as a measuring pipe whose inner surface and pipe connection end faces of the flanges 56b and 56c are covered with a lining material. When a new measuring pipe is to be molded continuously, the new second lower mold 56 is placed on the first lower mold 55, and the upper mold 44 and transfer pot 31 are placed on the second lower mold 56. Molding is then performed in accordance with the above procedure.

More specifically, when PFA resin 450HP-J available from Dupont Mitsui Fluorochemicals Co., Ltd. was used as the molding material 9, the mold temperature was set to 360° C., and the resin temperature was set to 360° C. In this case, it was confirmed that no resin leaked when the seal ratio K was set to 0.32.

This embodiment has exemplified the case where molding is performed without the support members 70 and connecting bolts 71 shown in FIG. 2. If, however, pressing force F=Fn−Fm is large, and the mold 30, especially the second lower mold 56 serving as a molded product, is thin and has a low strength, the second lower mold 56 may be plastically deformed or destroyed due to buckling. In order to solve such a problem, molding is performed with the support members 70 and connecting bolts 71 being mounted. This case will be described as the second embodiment.

In this embodiment, support members 70 are interposed between a upper mold 44 and a first lower mold 55, and the upper ends of connecting bolts 71 are brought into contact with the upper mold 44 to make the support members 70 receive part of a pressing force Fn transferred from the upper mold 44 to a second lower mold 56, thereby reducing a pressing force F exerted on the second lower mold 56.

Each support member 70 is formed into a cylindrical shape that can be compressed and elastically deformed. The four support members 70 extend vertically upward from the outer peripheral portion of the first lower mold 55 at equal intervals in the circumferential direction. The upper end of each support member 70 is positioned below a first upper mold member 44A of the upper mold 44. The upper end face of the support member 70 has a screw hole 73 with which the connecting bolt 71 engages. As a material for the support member 70, hardened steel or the like is used.

The connecting bolt 71 is made of hardened steel and is engaged with the screw hole 73 of each support member 70, and is adjusted such that its head portion comes into contact with the lower surface of the upper mold 44. Note that other structures are the same as those in the first embodiment.

In an injection mold 30 having the above arrangement, when a thrust F1 is given to a pusher 32 to pressurize a molten molding material 9 in a transfer pot 31 so as to inject the molding material into a cavity 8 of the mold 30, the pressing force Fn is exerted on the mold 30 and the support members 70 through the mold 30. At this time, the support members 70 mainly bend, but the elastic force (reaction force) of the support members 70 acts on the upper mold 44, thus functioning as supports. As a consequence, the pressing force F exerted on the mold 30 is reduced. This prevents the second lower mold 56 from being elastically deformed or destroyed by buckling even if the second lower mold has a low strength. This embodiment can therefore be applied to a lining process using a resin which requires a high pressure or molding of a measuring pipe having a low strength.

A seal ratio K in the injection mold 30 will be described next.

Each support member 70 and second lower mold 56 contract by Δ1 due to an injection pressure P.

$$\Delta 1 = \frac{Fr}{E} \cdot \frac{1}{Sr} \cdot Lr = \frac{Fp}{E} \cdot \frac{1}{Sp} \cdot Lp \tag{1}$$

$$\therefore \begin{pmatrix} Fr = \frac{Sr}{Sp} \cdot \frac{Lp}{Lr} \cdot Fp \\ Fp = \frac{Sp}{Sr} \cdot \frac{Lr}{Lp} \cdot Fr \end{pmatrix} \tag{A}$$

$$\text{for} \left( \frac{\Delta 1}{Lr} = \frac{\sigma}{E} \right)$$

where P is the injection pressure, Sn is the projection area of the bottom plate when viewed from above, Sm is the projection area of the upper mold when viewed from below, Sa is the seal area, Sr is the cross-sectional area of each support member (support member body), Sp is the cross-sectional area of the second lower mold, Fn is the downward force (=P·Sn) produced in the bottom plate by an injection pressure, Fm is the force (=P·Sm) that is produced by the injection pressure and pushes the mold upward, Fr is the force exerted on each support member, Fp is the force exerted on the second lower mold, Lp is the distance between the flanges of the second lower mold, Lr is the length of each support member, Δ1 is the contraction amount of each support member, E is the Young's modulus of each support member (assumed to be equal to that of the second lower mold), and n is the number of support members.

Assume that the flanges 56b and 56c of the second lower mold 56 and the connecting bolts 71 do not deform.

The force balance is given by $$(Fn-Fm)=nFr+Fp \quad (2)$$

A substitution of mathematical expression (A) into equation (2) yields $$(Fn-Fm) = nFr + \frac{Sp}{Sr} \cdot \frac{Lr}{Lp} \cdot Fr \quad (Fn-Fm) = n\frac{Sr}{Sp} \cdot \frac{Lp}{Lr} \cdot Fp \quad (B)$$

$$\therefore Fr = \frac{Fn-Fm}{n + \frac{Sp}{Sr} \cdot \frac{Lr}{Lp}} \quad \therefore Fp = \frac{Fn-Fm}{n\frac{Sr}{Sp} \cdot \frac{Lp}{Lr} + 1}$$

The seal ratio K is obtained by using mathematical expression (B). A seal pressure Pa is expressed by $$Pa = \frac{Fp}{Sa} = \frac{Fn-Fm}{Sa\left(n \cdot \frac{Sr}{Sp} \cdot \frac{Lp}{Lr} + 1\right)} \quad (4)$$

The seal ratio K is obtained by dividing the both sides of equation (4) by P.

$$Pa/P = \frac{1}{P} = \frac{P(Sn-Sm)}{Sa\left(n\frac{Sr}{Sp} \cdot \frac{Lp}{Lr} + 1\right)} \quad (5)$$

$$Pa/P = \frac{Sn-Sm}{Sa} \cdot \frac{1}{n\frac{Sr}{Sp} \cdot \frac{Lp}{Lr} + 1} \quad (6)$$

The first term of equation (6) represents a normal seal ratio, and the second term represents a decrease due to the support members. The decrease ratio of the seal ratio is expressed by $$\left(n \cdot \frac{Sr}{Sp} \cdot \frac{Lp}{Lr} + 1\right) > 1 \rightarrow \frac{1}{n\frac{Sr}{Sp} \cdot \frac{Lp}{Lr} + 1} < 1 \quad (7)$$

Figure 6:
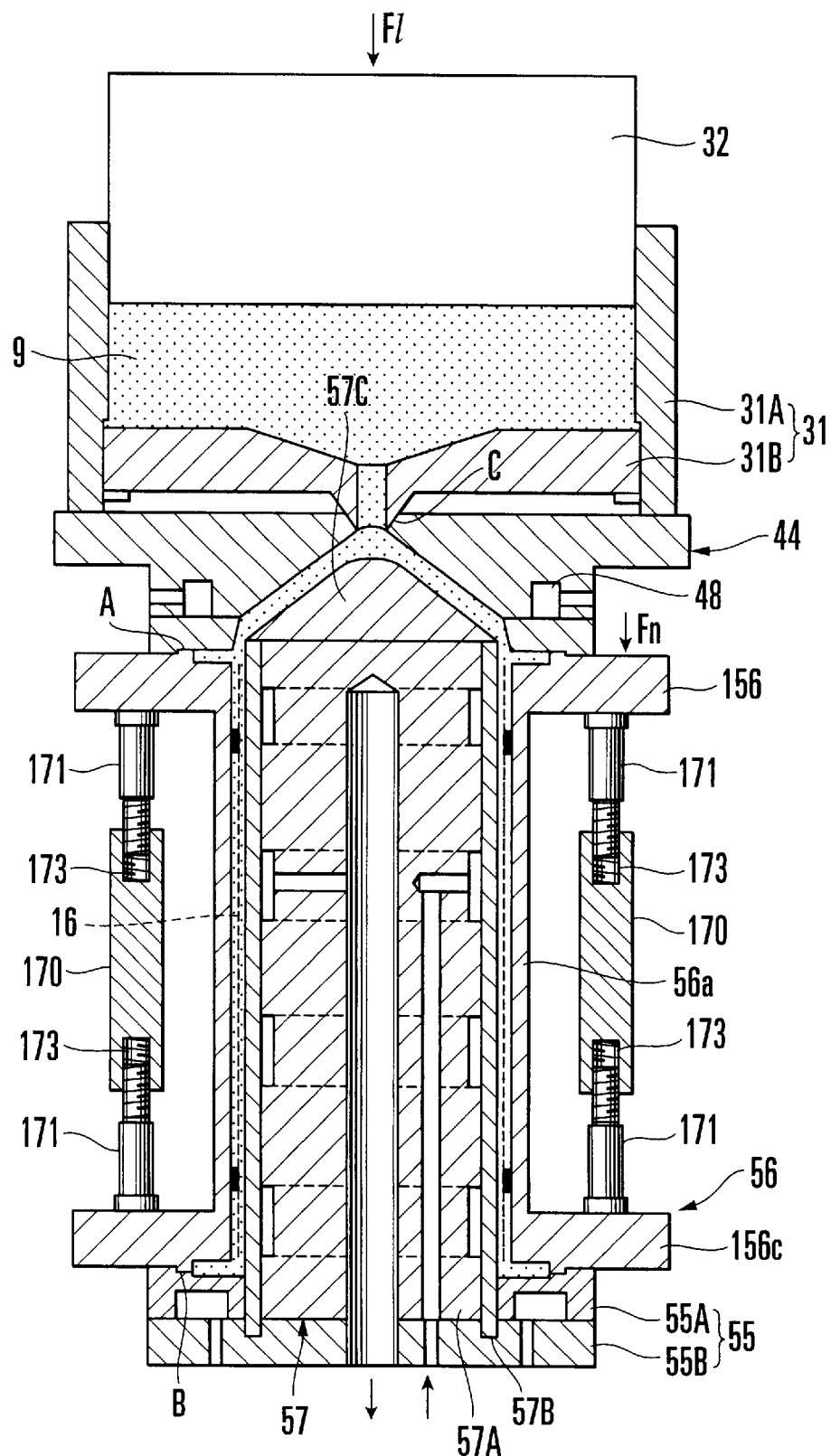
FIG. 6 is a sectional view of an injection mold according to the second embodiment of the present invention.

FIG. 6 shows an injection mold according to the third embodiment of the present invention.

In this embodiment, the present invention is applied to a measuring pipe which is designed such that flanges 156b and 156c of a second lower mold 56 are large, and the inter-face distance (the distance between the pipe connection end faces) is long. According to this embodiment, a plurality of elastically deformable support members 170 are interposed between the flanges 156b and 156c of the second lower mold 56, and each support member 170 is coupled to the upper and lower flanges 156b and 156c of the second lower mold 56 with two connecting bolts 171. The upper and lower end faces of the support member 170 have screw holes 173 into which the connecting bolts 171 are screwed. Other structures are the same as those in the first embodiment.

In this structure, the support members 170 function as supports to hold the distance between the upper and lower flanges 156b and 156c substantially constant. This prevents the second lower mold 56 from being buckled or destroyed by a pressing force Fn.

Figure 7:
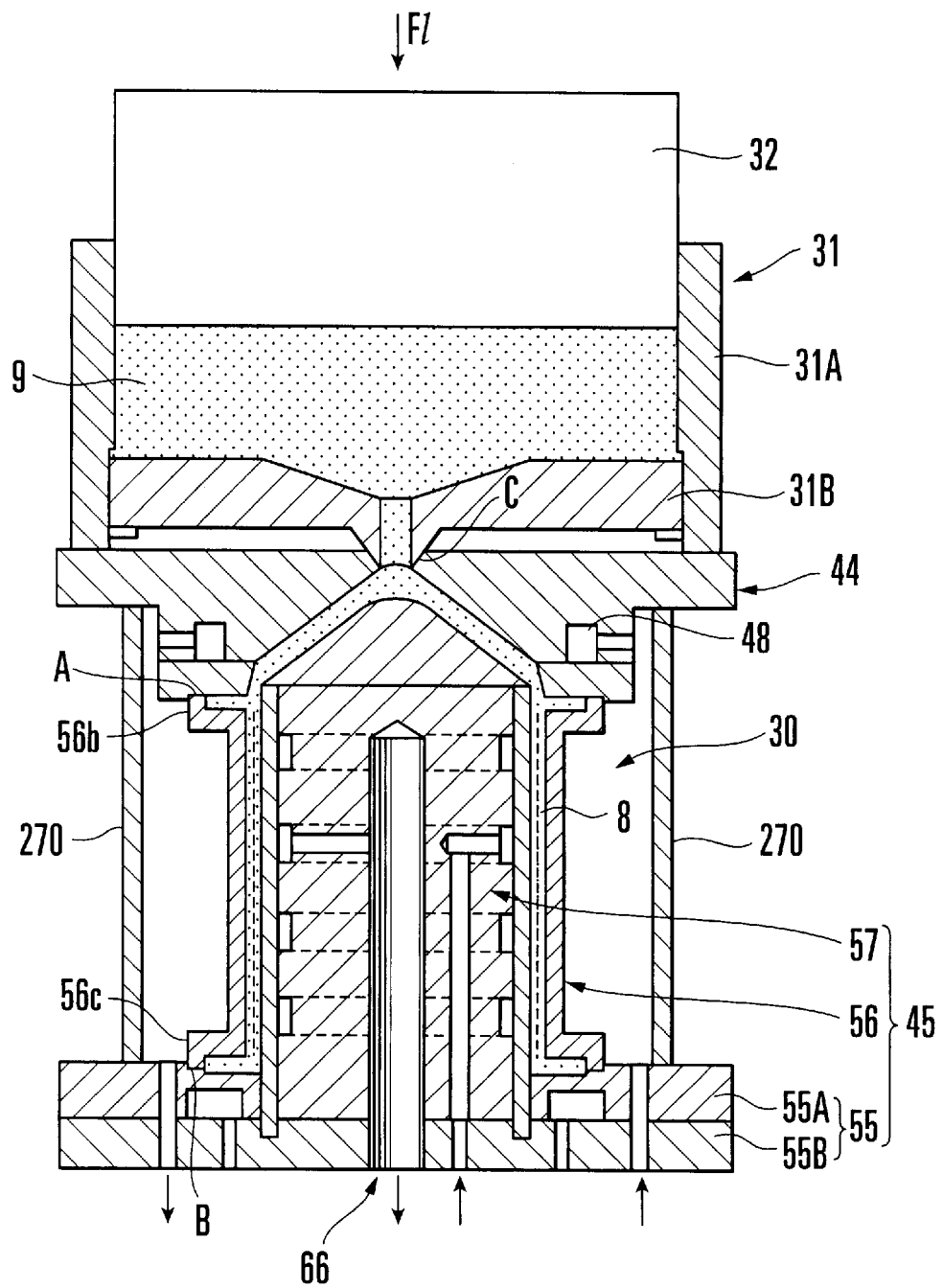
FIG. 7 is a sectional view of an injection mold according to the third embodiment of the present invention.

FIG. 7 shows an injection mold according to the fourth embodiment.

In this embodiment, as in the first embodiment, the present invention is applied to a wafer type measuring pipe having a second lower mold 56 with flanges 56b and 56c whose outer diameters are small. In this embodiment, a support member 270 formed by an elastically deformable cylindrical member is interposed between a upper mold 44 and a first lower mold 55, and the upper mold 44 is directly supported on the upper surface of the support member 270. Other structures are the same as those in the first embodiment.

In this structure as well, the same effects as those of each embodiment described above can be obtained. However, since the heat generated in injection molding remains inside the support member 270 to delay cooling of a mold 30, cooling air is preferably supplied not only to the inside of the mold 30 but also to a portion around the support member 270 located outside the mold after molding so as to improve the cooling effect.

Figure 8:
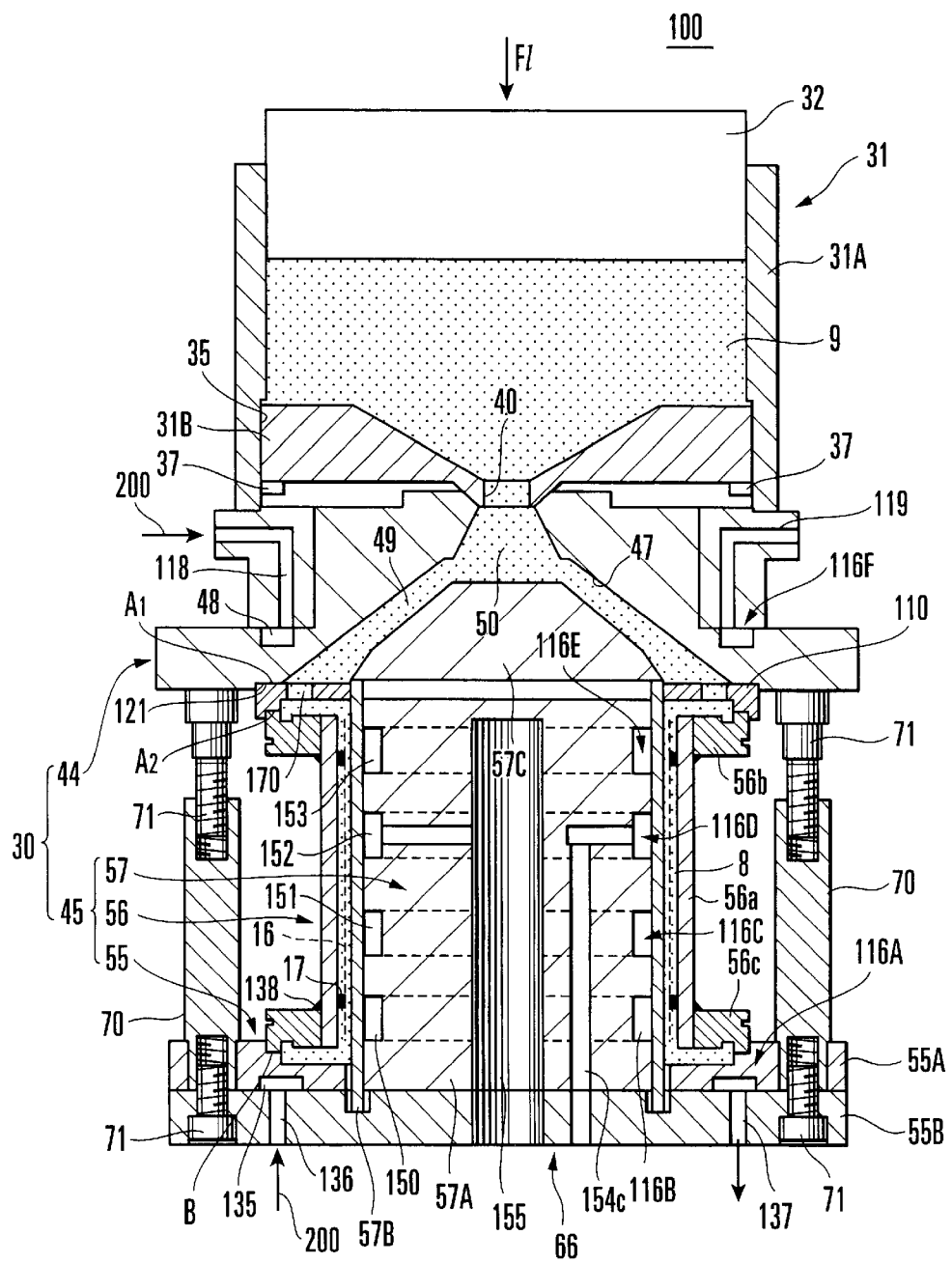
FIG. 8 is a sectional view of an injection mold according to the fourth embodiment of the present invention.

FIG. 8 shows an injection mold according to the fifth embodiment of the present invention.

According to the measuring pipe of an electromagnetic flowmeter of a flange type, a second lower mold 56 as a component of the measuring pipe is generally manufactured by fitting flanges 56b and 56c on the outer surface portions of the two end portions of a pipe body 56a and joining them to each other by welding. For this reason, the dimensional precision is low, and the axis of the pipe body 56a may not match with that of the flanges 56b and 56c or the flanges 56b and 56c may be mounted on the pipe body 56a with a tilt. For this reason, when injection molding is performed, the thickness of a lining material varies or the surface of a reinforcing pipe 16 is exposed to the outside, resulting in a defective product. In a measuring pipe, as the distance between the pipe connection end faces increases, in particular, such a problem becomes a factor that considerably degrades the quality of a molded product, because variations in thickness become large.

This embodiment is aimed at solving this problem. Note that the same reference numerals as in the first embodiment denote the same or equivalent parts in this embodiment, and a description thereof will be omitted.

Referring to FIG. 8, an injection mold 30 is made up of a upper mold 44, lower mold 45, and a gate ring 110 and incorporates a cooling mechanism 66. The upper mold 44 has a conical recess portion 47 formed in the central portion of the lower surface and is placed on the lower mold 45 through the gate ring 110. The lower mold 45 is made up of first and second lower molds 55 and 56 and core 57. The upper mold 44 and first lower mold 55 are coupled to each other with a plurality of support members 70 and bolts 71.

The second lower mold 56 is formed into a cylindrical shape and positioned/placed on the first lower mold 55. A measuring pipe for an electromagnetic flowmeter, which is the second lower mold 56, is made up of the pipe body 56a and the pair of upper and lower flanges 56b and 56c fitted on the outer surfaces of the two end portions of the pipe body 56a and joined to each other by welding 138. The reinforcing pipe 16 formed by a perforated plate is fixed in the pipe body 56a through a spacer 17.

The cooling mechanism 66 of the mold 30 has first to sixth cooling circuits 116A to 116F. The first cooling circuit 116A is comprised of an annular groove 135 formed on the lower surface side of a first lower mold member 55A and an air inlet 136 and air outlet 137 which are formed in a second lower mold member 55B and communicate with the annular groove 135. The air inlet 136 is connected to an air source (not shown), and the air outlet 137 is open to the atmosphere.

Figure 10:
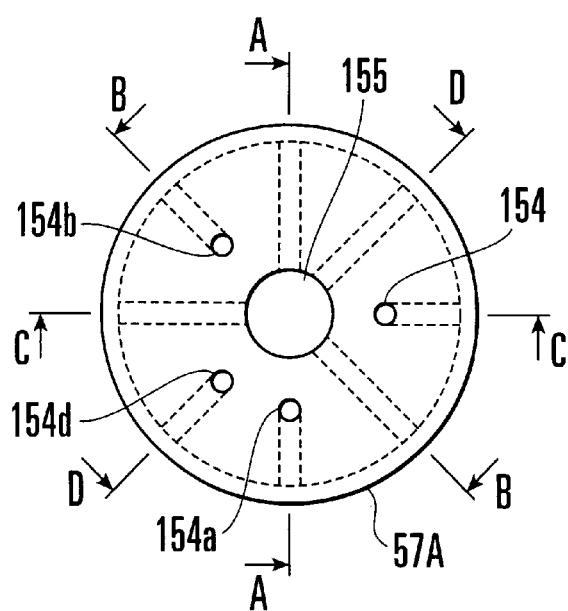
FIG. 10 is a bottom view of a core in FIG. 8.
Figure 11A:
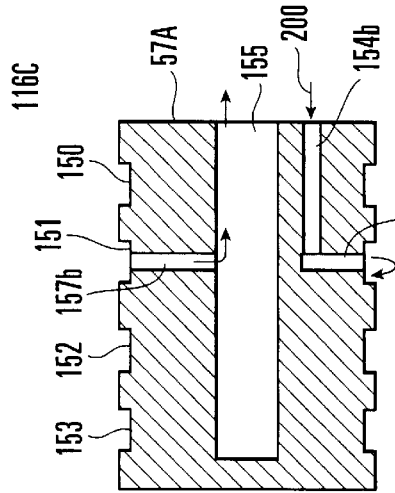
FIGS. 11A to 11D are sectional views taken along lines A—A, B—B, C—C, and D—D in FIG. 10.
Figure 11B:
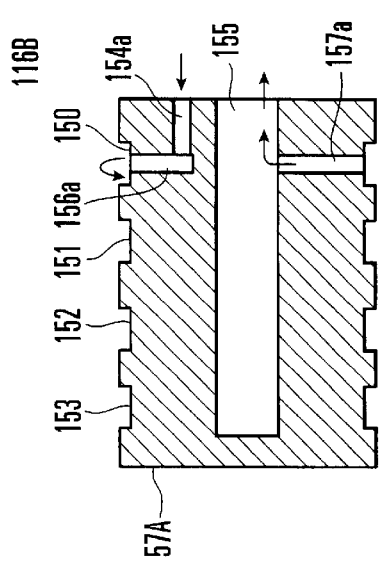
Figure 11C:
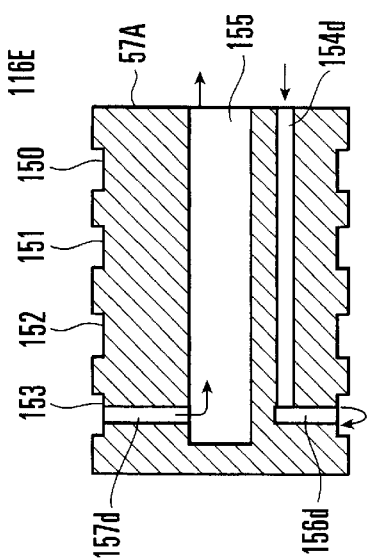
Figure 11D:
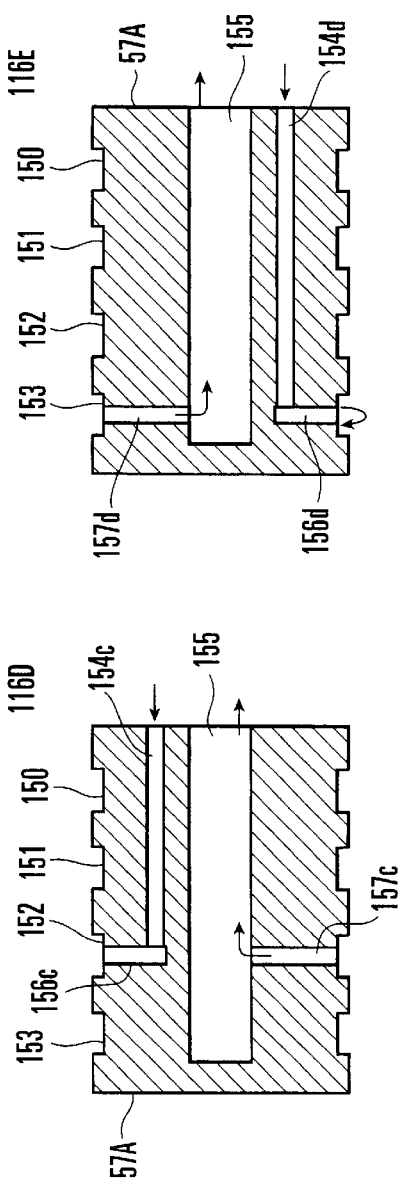

The second to fifth cooling circuits 116B to 116E are formed in the core 57 and have annular grooves 150 to 153 formed in the outer surface of a core body 57A to be separate from each other in the axial direction. As shown in FIGS. 10 and 11A to 11D, the annular grooves 150 to 153 communicate with air supply paths 154a to 154d and air discharge path 155 formed in the core body 57A through communicating paths 156a to 156d and 157a to 157d. The air supply paths 154a to 154d are blind holes that are open to the lower surface of the core body 57A and formed around the air discharge path 155 at predetermined angular intervals in the circumferential direction. That is, as shown in FIG. 10, the air supply paths 154a to 154d are formed at 135° intervals in the clockwise direction.

The air supply path 154b is 135° away from the air supply path 154a in the clockwise direction, the air supply path 154c is 135° away from the air supply path 154b in the clockwise direction, and the air supply path 154d is 135° away from the air supply path 154c in the clockwise direction. The air discharge path 155 is formed by a blind hole that is open to the central portion of the lower surface of the core body 57A and has a diameter larger than that of the air supply paths 154a to 154d.

Figure 9:
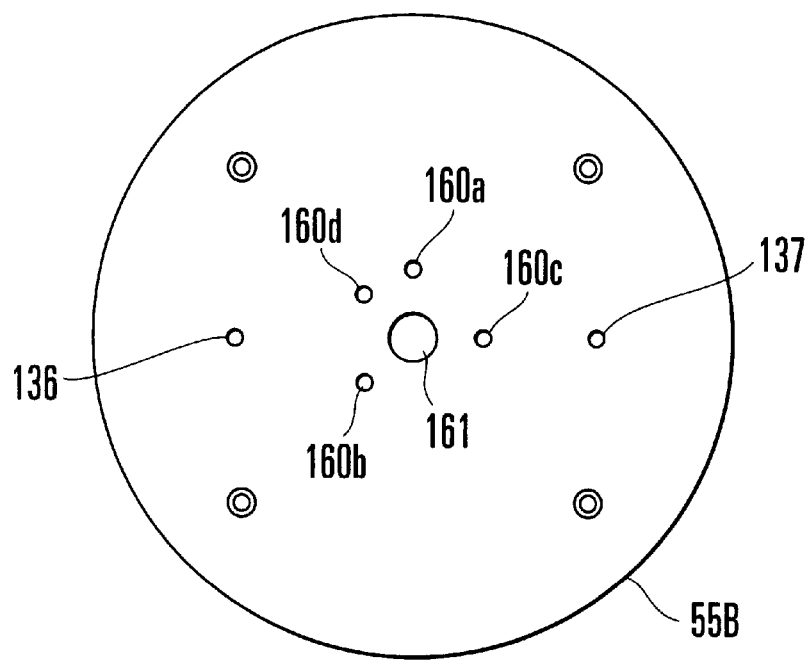
FIG. 9 is a plan view of a second lower mold member in FIG. 8.

As shown in FIG. 9, paths 160a to 160d and 161 communicating with the air supply paths 154a to 154d and air discharge path 155 are formed in the second lower mold member 55B. The paths 160a to 160d and 161 are through holes that extend through the upper and lower surfaces of the second lower mold member 55B. The paths 160a to 160d are connected to an air source (not shown), and the path 161 is open to the atmosphere. The sixth cooling circuit 116F has an annular groove 48 formed in the upper mold 44 and an air inlet 118 and air outlet 119 communicating with the annular groove 48. The air inlet 118 is not connected to the air source (not shown), and the air outlet 119 is open to the atmosphere.

Figure 12:
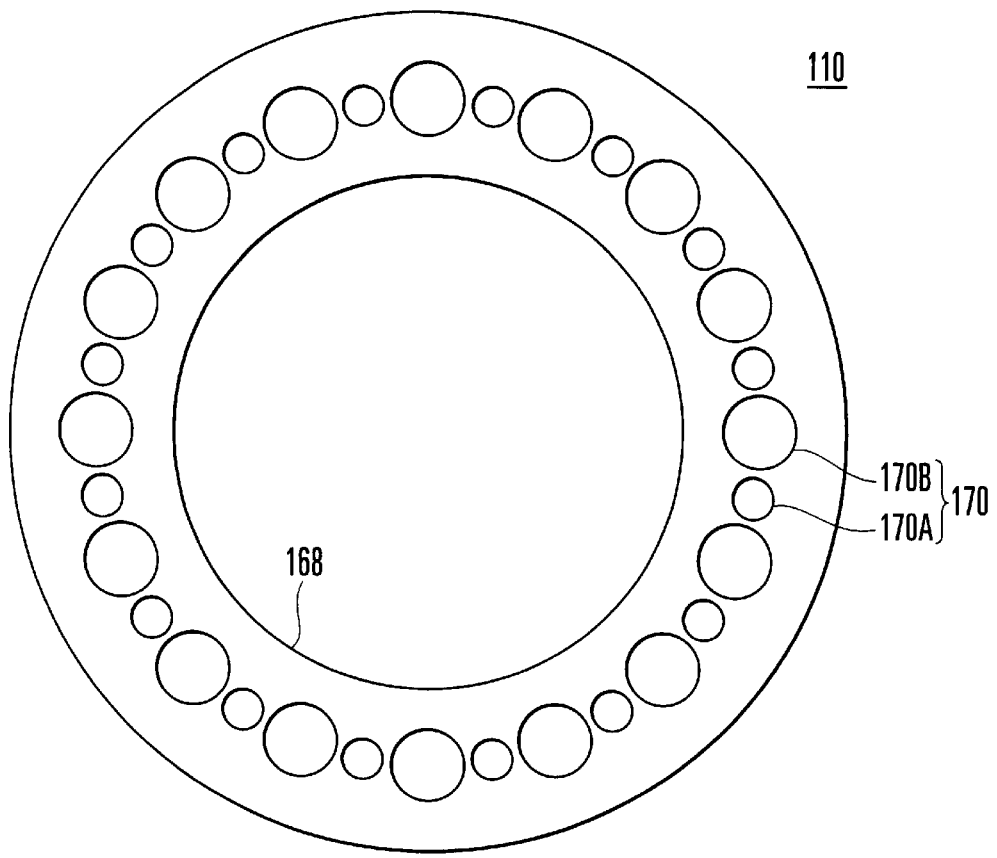
FIG. 12 is a plan view of a gate ring in FIG. 8.
Figure 13:
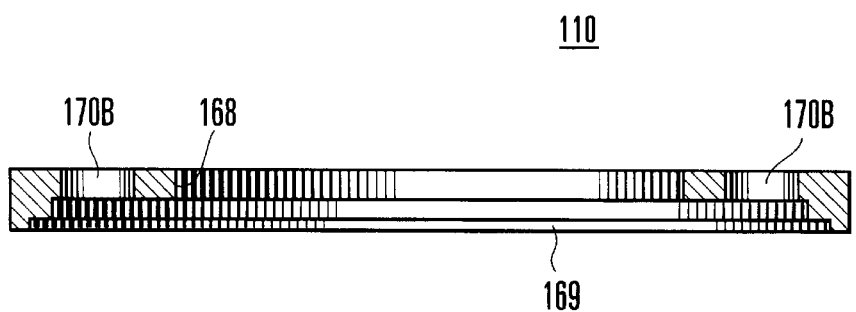
FIG. 13 is a sectional view of the gate ring in FIG. 8.
Figure 14:
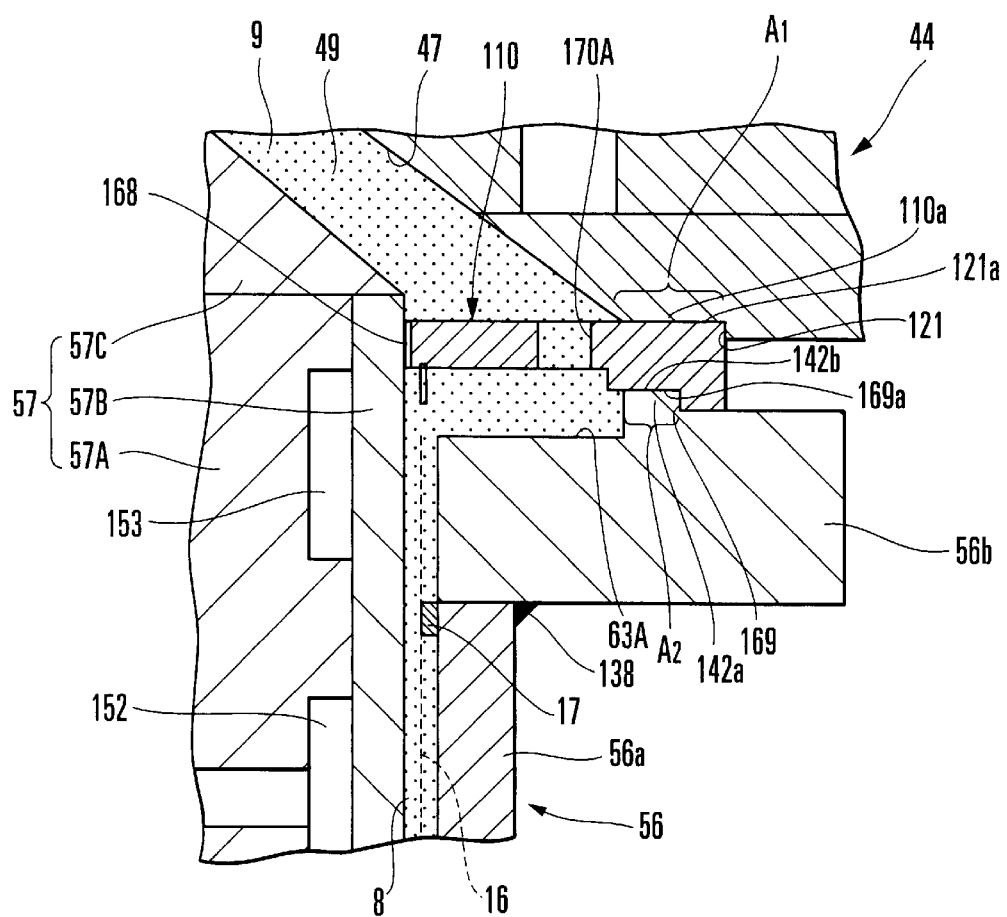
FIG. 14 is a partial enlarged view of the gate ring in FIG. 13.

The gate ring 110 positions the core 57 with respect to the second lower mold 56 and makes a runner 49 communicate with a cavity 8 of the mold 30. The gate ring 110 is detachably fitted on the outer surface portion of the upper end portion of a cylindrical member 57B to be located between the upper mold 44 and the second lower mold 56. As shown in FIGS. 12 and 13, the gate ring 110 has a center hole 168 through which the core 57 extends, and the fitting tolerance between the center hole 168 and the core 57 is set to be small so that the axes of these two members almost coincide with each other. The upper surface of the gate ring 110 is flat and fitted in an annular groove 121 of the upper mold 44 in tight contact to form a seal portion A1, as shown in FIG. 14. A portion of an upper surface 110a of the gate ring 110 comes into contact with a portion of a bottom surface 121a of the annular groove 121 to form seal surfaces, which in turn form the seal portion A1.

The gate ring 110 has an annular groove 169 on the lower surface side. The annular groove 169 is fitted on a projection 142a extending vertically upward from the pipe connection end face of the upper flange 56b of the second lower mold 56. Portions of the projection 142a and annular groove 169 which are in tight contact with each other from seal surfaces 142b and 169a, which in turn form a seal portion A2. The seal surface 142b is the upper surface of the projection 142a, and the seal surface 169a is the bottom surface of the annular groove 169.

The gate ring 110 also has a gate 170 that causes the runner 49 formed by the upper mold 44 and core 57 to communicate with the cavity 8 of the mold 30 through the annular groove 169. As shown in FIG. 12, the gate 170 is made up of small-diameter gates 170A and large-diameter gates 170B which are through holes concentrically formed around the center of the gate ring 110. The small-diameter gates 170A and large-diameter gates 170B are formed to be alternately adjacent to each other and located near the outer surface portion of an annular groove 63A of the upper flange 56b, as shown in FIG. 4.

When the projection 142a is fitted in the annular groove 169 to place the gate ring 110 on the upper surface of the upper flange 56b, the core 57 is positioned to the second lower mold 56 and their centers coincide with each other. The core 57 is so mounted as to be slightly movable in the radial direction relative to the first lower mold 55.

A procedure for forming a measuring pipe for an electromagnetic flowmeter by using an injection molding apparatus 100 having the above arrangement will be described next. First of all, the mold 30 is placed on a mold mount plate 26 (FIG. 1). At this time, the core 57 is positioned by the gate ring 110. That is, the gate ring 110 is fitted on the projection 142a of the upper flange 56b while the upper portion of the core 57 is fitted in the annular groove 169 of the gate ring 110 in advance. With this operation, the axis of the second lower mold 56 coincides with that of the gate ring 110, and the axis of the core 57 is also forced to coincide with that of the second lower mold 56. This makes it possible to position the core 57 to the centers of the lower mold 45 and a second lower mold 46 without shifting or tilting with respect to the second lower mold 56.

After the core 57 is positioned by the gate ring 110, the annular groove 121 of the upper mold 44 is fitted on the gate ring 110 from above to make the axis of the upper mold 44 coincide with that of the second lower mold 56. A transfer pot 31 is then placed on the resultant structure.

The mold 30 is then placed in a heating furnace, together with the transfer pot 31 and a molding material 9 and heated to a predetermined temperature (350° C. to 370° C.). The molten molding material 9 is pressurized by a pusher 32 to be gradually pressurized and injected into the cavity 8 through a nozzle hole 40, a sprue 50, and the runner 49. The injection time is about 2 min. Air in the cavity 8 is discharged outside through the seal portion A1, the seal portion A2, and a seal portion B by an injection pressure P exerted by the pusher 32.

When the molten molding material 9 is pressurized by pushing the pusher 32 downward, the molding material 9 is injected from the nozzle hole 40 while pressurizing a bottom plate 31B downward. At the same time, the molten molding material 9 tends to leak upward through the gap (about 0.3 to 1.0 mm, in general) between the transfer pot 31 and the pusher 32. However, the temperature of the pusher 32 is set to be lower than that of the molding material 9, a portion of the molding material 9 which comes into contact with the pusher 32 is quenched and hardens. As a consequence, a frictional force is produced between the molding material 9 and the transfer pot 31 to act to raise the transfer pot 31. At this time, the bottom plate 31B presses pins 37 with the injection pressure P exerted by the pusher 32 to prevent the transfer pot 31 from being raised.

When the molten molding material 9 is pressurized by the pusher 32 and injected into the cavity 8 of the mold 30, the injection pressure P is directly exerted on the overall mold 30, and the mold 30 is compressed. At this time, the support member 70 also receives the injection pressure P and slightly deforms, thereby exerting a reaction force on the upper mold 44 against the injection pressure P. This prevents the second lower mold 56 from being plastically deformed or destroyed by the injection pressure P, and hence makes it possible to mold a resin requiring a high pressure or form a molded product having a low strength.

FIG. 15 shows a procedure for cooling the mold 30. In the entire cooling process, a hydraulic cylinder keeps applying a thrust F1 to the pusher 32 to maintain the pressure P on the molten molding material 9 left in the transfer pot 31. After injection of the molding material 9 is completed, the molded product is left standing for several min to make a residual stress distribution uniform. Compressed air 200 is sequentially supplied to the first to sixth cooling circuits 116A to 116F at predetermined time intervals to cool the mold 30, thereby gradually hardening the molding material 9 in the cavity 8 upward. With this operation, the molten molding material 9 is replenished from the transfer pot 31 in accordance with the volume shrinkage caused when the molding material 9 in the cavity 8 hardens, thereby obtaining a high-quality molded product without any molding sink.

When the molding material 9 completely hardens and molding is complete, mold releasing is performed to extract the second lower mold 56 as a molded product. In extracting the molded product, the transfer pot 31 is rotated first to cut the molding material 9 in the runner 49 from the bottom plate 31B. The upper mold 44 is then raised, together with the transfer pot 31, to extract the second lower mold 56 from the first lower mold 55, and the burr and a portion of the molding material 9 which hardens at the runner 49 are cut. The second lower mold 56 is used as a measuring pipe whose inner surface and pipe connection end faces of the flanges 56b and 56c are covered with a lining material.

When a new measuring pipe is to be molded continuously, the new second lower mold 56 is placed on the first lower mold 55, and the upper mold 44 and transfer pot 31 are placed on the second lower mold 56. Molding is then performed in accordance with the above procedure.

The reason why the molding material 9 does not leak from the seal portions A1, A2, and B will be described next.

(1) Without Support Members 70

When the molten molding material 9 is pressurized and injected into the cavity 8 of the mold 30 by the pusher 32, the injection pressure P is produced in the entire mold 30 in accordance with the thrust exerted by the pusher 32. As a consequence, a downward thrust (pressing force) Fn is produced in the bottom plate 31B. When the upper mold 44 is pressed against the second lower mold 56, a clamping force is produced between the upper mold 44 and the second lower mold 56. Likewise, the second lower mold 56 is pressed against the first lower mold 55 to produce a similar clamping force between them. The pressing force Fn exerted from the bottom plate 31B onto the mold 30 is obtained from a projection area Sn of the bottom plate 31B and the injection pressure P.

$$Fn = P \cdot Sn$$

In contrast to this, the injection pressure P produces an upward thrust (a force that tries to separate the upper mold 44 from the second lower mold 56) Fm in the mold 30. This thrust Fm is obtained from a projection area Sm of the upper mold 44 and the injection pressure P.

$$Fm = P \cdot Sm$$

A force F that is produced by the pressing force Fn on the upper mold 44 of the bottom plate 31B and presses the seal portions A1, A2, and B of the mold 30 is obtained by $$F = Fn - Fm$$

If Fn becomes smaller than Fm, since the upper mold 44 is raised, sealing is impaired.

Letting S1, S2, and S3 be the areas of the seal portions A1, A2, and B, and Pa1, Pa2, and Pa3 be the pressures (seal pressures) produced at the respective seal portions A1, A2, and B, the seal pressures Pa1, Pa2, and Pa3 at the seal portions A1, A2, and B are given by $$Pa1 = (Fn-Fm)/S1 = (Sn-Sm)P/S1$$

$$Pa2 = (Fn-Fm)/S2 = (Sn-Sm)P/S2$$

$$Pa3 = (Fn-Fm)/S3 = (Sn-Sm)P/S3$$

Seal ratios K (K1, K2, and K3) are values Pa1/P, Pa2/P, and Pa3/P obtained by dividing the seal pressures Pa1, Pa2, and Pa3 by the injection pressure P. The seal ratios K are dimensionless numerical values and determined at the time of design of a mold. If the seal ratios K are larger than given values, the molding material 9 does not leak from the seal portions A1, A2, and B, and vice versa. A threshold that determines whether the molding material 9 leaks or not is a constant C determined by the molding material 9 and vary depending on the type, viscosity, mold temperature, and the like of the molding material 9.

As described above, the total weight of the molding material 9, upper mold 44, second lower mold 56, transfer pot 31, and the like (with a bore of 100 mm: 21.5 Kg, with a bore of 40 mm: about 4.3 Kg) is very small as compared with the pressing force Fn exerted by the bottom plate 31B and the thrust Fm. Therefore, the total weight has little influence on the seal ratios K1, K2, and K3, and hence can be neglected as an error range. That is, the seal ratios K1, K2, and K3 are hardly influenced by the weights of the upper mold 44, second lower mold 56, transfer pot 31, and the like. Note that the seal ratios K1, K2, and K3 were 1 to 3 with both a bore of 100 mm and a bore of 40 mm.

In preventing the molding material 9 from leaking from the seal portions A1, A2, and B, a minimum requirement is that the respective seal pressures Pa1, Pa2, and Pa3 should be positive values. As is obvious from the equations given above, as the thrust produced by the pusher 32 is increased, the injection pressure P increases, and the seal pressures Pa1, Pa2, and Pa3 can be increased. If however, the thrust produced by the pusher 32 is excessively increased, internal stress remains in the molded product and becomes a cause of a fracture due to deformation and cracking.

The seal ratios K1, K2, and K3 are determined when the injection molding apparatus 100 is designed. As described above, however, in actual molding, if these seal ratios are smaller than the constant C determined by the type, viscosity, temperature, and the like of the molding material 9, the molding material 9 leaks from the seal portions A1, A2, and B, and vice versa. The constant C is inductively obtained by experiment. Molding is actually performed while the seal ratios K1, K2, and K3 and the type, viscosity, and temperature of the molding material 9 are changed. The values obtained when the molding material 9 stops leaking are set as the seal ratios K1, K2, and K3. Assume that when molding is performed with the seal ratio K1 being set to 0.3, the molding material 9 stops leaking from the seal portion A1. In this case, the constant C is 0.3. In order to prevent the molding material 9 from leaking from the seal portion A1, the seal ratio K1 needs to be larger than 0.3. That is, the molding material 9 can be prevented from leaking from the seal portions A1 and A2 by satisfying $$Pa/P > C$$

In conducting an experiment, a mold having large seal areas S1, S2, and S3 is manufactured, and molding is performed. Molding is repeatedly performed while the seal ratios K1, K2, and K3 are increased by gradually decreasing the seal areas S1, S2, and S3 by gradually cutting the seal portions A1, A2, and B. The seal ratios K1, K2, and K3 at the time when the molding material 9 stops leaking from the seal portions A1, A2, and B are set as the constant C.

(2) With Support Members 70

When the support members 70 are used, since the upper mold 44 and support members 70 receive the injection pressure P, the force F that presses the seal portions A1, A2, and B decreases. Consequently, the seal ratios K1, K2, and B decrease.

Figure 16:
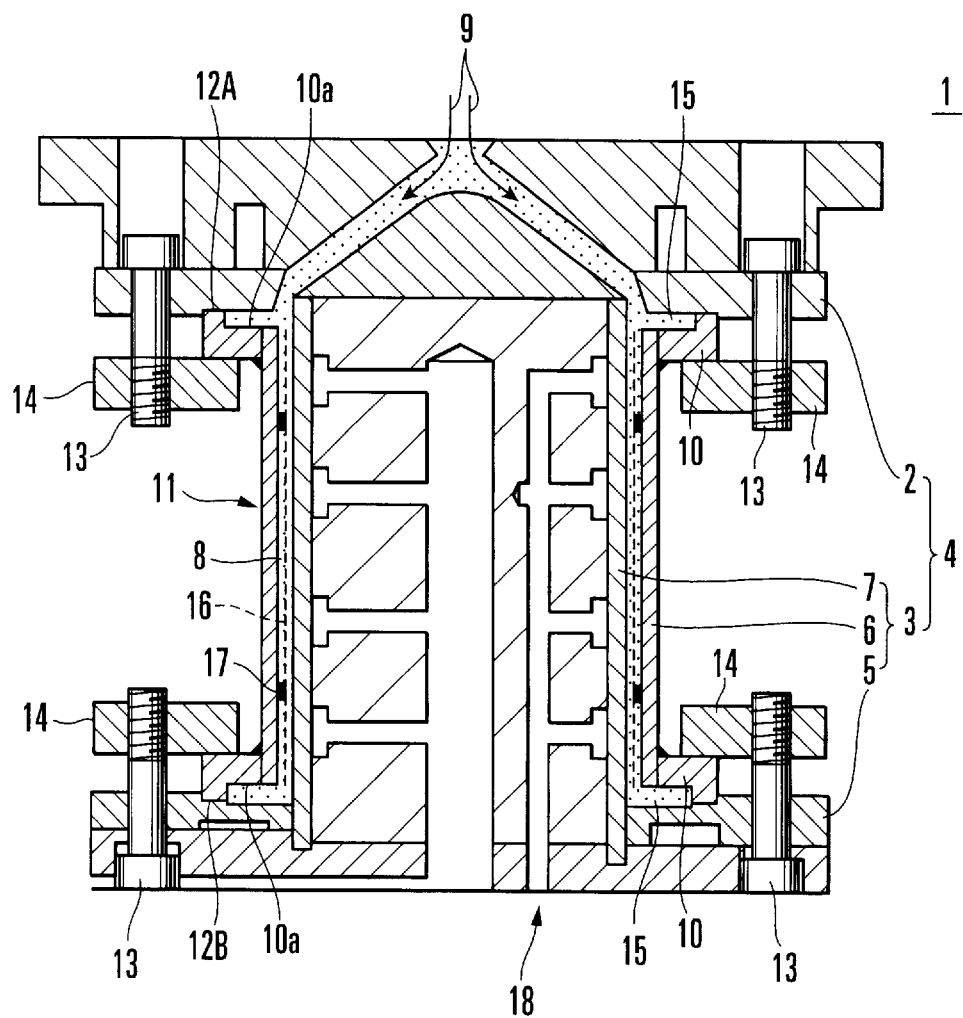
FIG. 16 is a sectional view of a conventional injection mold.

In this injection molding apparatus 100, since the mold 30 need not be closed, the structure can be simplified and the number of parts can be decreased as compared with the conventional injection mold 4 shown in FIG. 16. In addition, the productivity can be improved by shortening the injection molding cycle.

Since the core 57 is placed on the first lower mold 55 to be movable in the radial direction, the gate ring 110 is positioned and placed on the second lower mold 56. At this time, the gate ring 110 positions the core 57 with respect to the second lower mold 56 to almost match their axes. Therefore, no variations in thickness occur, and the dimensional precision of the thickness of a molded member can be improved. This makes it possible to reduce the percent defective.

In addition, since the gate 170 of the gate ring 110 is made up of the small-diameter gates 170A and large-diameter gates 170B which are alternately adjacent to each other, the formation of weld lines can be prevented. More specifically, if the gate 170 is constituted by a plurality of holes having the same size, portions of the molding material 9 are formed into laminar flows with an almost constant flow rate immediately after they pass through the holes, and come into contact with each other. As a result, the contact portions become weld lines to form a striped pattern on the surface of the molded product. The formation of weld lines can be effectively minimized by reducing not only the gate diameter but also the gate intervals. In general, however, the flowability of a molding material is proportional to the third power of the gate diameter. As the gate diameter decreases, the molding material flows with greater difficulty, resulting in a longer molding time and causing a molding failure.

When the gate 170 was made up of two types of gates 170A and 170B having different hole diameters which were alternately arranged, and an experiment was conducted, the formation of weld lines could be considerably suppressed. Although the reason why weld lines are reduced is not clear, it can be thought that since portions of the molding material 9 which pass through the small-diameter gates 170A and large-diameter gates 170B differ in their flow speeds, even if the portions of the molding material 9 become laminar flows immediately after they pass through the respective gates, the laminar flows mix each other when they come into contact with each other owing to the different flow speeds, thus making it difficult to produce weld lines.

Each embodiment described above has exemplified the case where the present invention is applied to the injection molding apparatus for lining the inner surface of a measuring pipe and the pipe connection end faces of flanges. However, the present invention is not limited to this. For example, vessels and cup-like members, especially members used in the clean room of a semiconductor manufacturing factory, can be manufactured at low costs by using the injection molding apparatus according to the present invention because almost 100% of them are made of fluoroplastic materials. In addition, the present invention can be applied to, for example, plate-like molded products as well as tubular molded products.

In the above embodiment, since a molded product is a measuring pipe, the lower mold 45 of the mold 30 is made up of the first and second lower molds 55 and 56 and the core 57, and the second lower mold 56 is formed by a measuring pipe. Depending on a molded product, however, a mold may be made up of only one lower mold and one upper mold.

In addition, the seal portions A (A1, A2) and B of the mold need not be flat surfaces and may be inclined surfaces. Furthermore, a thrust may be given to the pusher 32 by fixing the pusher 32 and raising the mold 30 using a hydraulic jack to relatively give a thrust to the pusher 32 instead of lowering the plunger 33 by using the hydraulic cylinder 22 to push the pusher 32 downward.

As has been described above, according to the present invention, since a thrust that is provided to pressurize a molding material can be used to bring the seal surface around the nozzle hole, the seal surface around the sprue, and the seal surfaces of the respective stacked members into tight contact with each other, there is no need to use the conventional closing means. This makes it possible to simplify the structure.

In addition, a seal pressure can be determined in accordance with each molding material so as to prevent the molding material from leaking from a corresponding seal surface, and hence a mold can be properly designed. Since a component of a molded product is also used as part of a mold, no additional mold is required. If a stacked member does not have a sufficient mechanical strength, plastic deformation or destruction of the stacked member can be prevented by weakening the force exerted on it. When a vessel is placed on a mold, since the lower end of a cylindrical member as a component of the vessel comes into contact with the upper surface of the mold, the vessel can be placed with high stability. This makes it possible to easily position the nozzle hole and the spray.

When the thrust providing means provides a thrust to the pusher, a molding material enters the gap between the outer surface of the pusher and the inner surface of the cylindrical member of the vessel and hardens to raise the cylindrical member. However, when the cylindrical member slightly moves upward, the lock members come into contact with the bottom plate to stop the upward movement of the cylindrical member. Since the lower end of the cylindrical member separates from the upper surface of the mold, the thrust is exclusively transferred from the seal surface around the nozzle hole to the seal surface around the sprue. Since a large seal pressure is obtained, there is no chance that the molding material will leak from between these seal surfaces.

What is claimed is:

1. Art injection molding method comprising:

storing a molding material in a vessel;

filling a mold made up of a plurality of stacked members with the molding material injected from the vessel;

providing a thrust to a pusher to pressurize one of the pusher and the mold through the molding material in the vessel; and closing the mold by using a thrust from the pusher, wherein P is an injection pressure exerted on the molding material, Pa is a seal pressure exerted on a seal portion between the stacked members, Fn is the pressing force acting on an upper mold of a bottom plate, Fm is thrust obtained from a projection area of the upper mold and the injection pressure P, and Sa is the area of the seal portion, wherein Pa=(Fn−Fm)/Sa, and Pa/P>C hold with no leakage, wherein said C is equal to 0.32 and said molding material is perflouroalkoxy.

2. The method of claim 1, wherein said mold and said molding material are kept at the same temperature.

* * * * *

UNITED STATES PATENT AND TRADEMARK OFFICE
CERTIFICATE OF CORRECTION

PATENT NO. : 6,689,303 B2
DATED : February 10, 2004
INVENTOR(S) : Seki et al.

It is certified that error appears in the above-identified patent and that said Letters Patent is hereby corrected as shown below:

Column 18,
Lines 55-65, please delete "closing the mold by using a thrust from the pusher, wherein P is an injection pressure exerted on the molding material, Pa is a seal pressure exerted on a seal portion between the stacked members, Fn is the pressing force acting on an upper mold of a bottom plate, Fm is thrust obtained from a projection area of the upper mold and the injection pressure P, and Sa is the area of the seal portion, wherein Pa= (Fn-Fm)/Sa, and Pa/P>C hold with no leakage, wherein said C is equal to 0.32 and said molding material is perflouroalkoxy." and insert
-- closing the mold by using a thrust from the pusher, wherein letting P be an injection pressure exerted in the molding material, Pa be a seal pressure exerted on a seal portion between the stacked members,
Pa/P>C holds, wherein said C is equal to 0.32 and said molding material is perflouroalkoxy. --.

Signed and Sealed this

Twenty-eighth Day of December, 2004

JON W. DUDAS
*Director of the United States Patent and Trademark Office*